United States Patent
Li et al.

(10) Patent No.: US 11,259,316 B2
(45) Date of Patent: Feb. 22, 2022

(54) METHOD FOR DATA TRANSMISSION WITH INTRODUCE OF APERIODIC CSI-RS, BASE STATION AND TERMINAL

(71) Applicant: CHINA ACADEMY OF TELECOMMUNICATIONS TECHNOLOGY, Beijing (CN)

(72) Inventors: Hui Li, Beijing (CN); Runhua Chen, Beijing (CN); Qiubin Gao, Beijing (CN); Rakesh Tamrakar, Beijing (CN); Qiuping Huang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/468,867

(22) PCT Filed: Oct. 17, 2017

(86) PCT No.: PCT/CN2017/106491
§ 371 (c)(1),
(2) Date: Jun. 12, 2019

(87) PCT Pub. No.: WO2018/107886
PCT Pub. Date: Jun. 21, 2018

(65) Prior Publication Data
US 2020/0077427 A1 Mar. 5, 2020

(30) Foreign Application Priority Data
Dec. 13, 2016 (CN) .......................... 201611146857.X

(51) Int. Cl.
*H04W 72/12* (2009.01)
*H04W 76/27* (2018.01)
(Continued)

(52) U.S. Cl.
CPC ....... *H04W 72/1273* (2013.01); *H04L 1/0026* (2013.01); *H04L 5/0051* (2013.01);
(Continued)

(58) Field of Classification Search
CPC ................................................. H04W 72/1273
See application file for complete search history.

(56) References Cited

U.S. PATENT DOCUMENTS

| 2014/0092760 | A1* | 4/2014 | Geirhofer | ............. | H04L 5/0035 370/252 |
| 2017/0041059 | A1* | 2/2017 | Yi | ........................ | H04B 7/0456 |
| 2019/0280803 | A1* | 9/2019 | Muruganathan | .... | H04W 72/042 |

FOREIGN PATENT DOCUMENTS

WO 2016122852 A1 8/2016

OTHER PUBLICATIONS

European Search Report, PCT/CN2017106491, China Academy of Telecommunications Technology, dated Oct. 31, 2019.
(Continued)

*Primary Examiner* — Edan Orgad
*Assistant Examiner* — Won Tae C Kim
(74) *Attorney, Agent, or Firm* — Harness, Dickey & Pierce, P.L.C.

(57) ABSTRACT

A method for data transmission, a base station and a terminal are provided. The method for data transmission includes: configuring the number of bits occupied by downlink control information (DCI) used to indicate physical downlink shared channel (PDSCH) scheduling on each of all carriers corresponding to a to-be-scheduled terminal to be N, where N is a maximum number of bits occupied by the DCI that is used to indicate the PDSCH scheduling on a carrier configured with an aperiodic channel state information reference signal (CSI-RS); and constructing scheduling information for indicating the PDSCH scheduling based on the configured DCI,
(Continued)

and transmitting the scheduling information to the to-be-scheduled terminal.

10 Claims, 2 Drawing Sheets

(51) Int. Cl.
　　　*H04L 1/00*　　　(2006.01)
　　　*H04L 5/00*　　　(2006.01)
　　　*H04W 72/04*　　(2009.01)
(52) U.S. Cl.
　　　CPC ..... *H04W 72/042* (2013.01); *H04W 72/0453* (2013.01); *H04W 76/27* (2018.02)

(56) References Cited

OTHER PUBLICATIONS

3GPP TSG RAN WG1 Meeting #86, Goteborg, Sweden, Aug. 22-26, 2016, Agenda Item 7.2.4.1.2, Source: Huawei, HiSilicon, Title: Rate Matching Enhancements for Aperiodic CSI-RS in Different Transition Mode, Document for: Discussion and Decision.

* cited by examiner

METHOD FOR DATA TRANSMISSION WITH INTRODUCE OF APERIODIC CSI-RS, BASE STATION AND TERMINAL

CROSS-REFERENCE TO RELATED APPLICATION

This application is the U.S. national phase of PCT Application No. PCT/CN2017/106491 filed on Oct. 17, 2017, which claims a priority to Chinese Patent Application No. 201611146857.x filed on Dec. 13, 2016, the disclosure of which is incorporated in its entirety by reference herein.

TECHNICAL FIELD

The present disclosure relates to the field of communication technology, in particular to a method for data transmission, a base station and a terminal.

BACKGROUND

A wireless communication system includes at least one transmitter and one receiver. In a downlink transmission of a cellular communication system, a transmitter is a base station (such as an eNB in 3GPP LTE) and a receiver is a user equipment (UE). The eNB transmits a downlink reference signal, and the UE receives the downlink reference signal to perform a channel measurement. Various types of reference signals (RSs) may be supported depending on different purposes of the channel measurement. For example, in 3GPP LTE, channel state information reference signal (CSI-RS) is used in channel measurement and channel state information (CSI) feedback. The system performs a selection from multiple CSI-RS resource configurations, and here each CSI-RS resource configuration uniquely determines one group of time and frequency resources (such as a resource element RE) for transmitting the CSI-RS. In LTE, a UE may be semi-statically configured with one or more CSI-RS resources. Each CSI-RS is transmitted periodically, that is, the CSI-RS is merely transmitted in a pre-defined set of subframes, and a period and a subframe offset of a periodic CSI-RS are semi-statically configured to the UE. When the UE receives downlink data (such as a physical downlink shared channel (PDSCH)), an RE for transmitting the CSI-RS cannot be used for transmitting the PDSCH; hence, PDSCH rate matching needs to be performed in consideration of the semi-statically configured periodic CSI-RS.

The above-described CSI-RS has a non-zero transmission power and is defined as a NZP-CSI-RS. In addition, a network may further configure one or more periodic zero-power CSI-RS (ZP-CSI-RS) resources, and PDSCH rate matching needs to be performed in consideration of these configured periodic CSI-RS resources.

Subframe periods and subframe offsets of periodic transmissions for the ZP-CSI-RS and the NZP-CSI-RS are indicated by a subframe configuration signaling subframe_config in a high-layer signaling information element (IE) region, where the subframe_config is a part of resource configurations for the ZP-CSI-RS and the NZP-CSI-RS.

Aperiodic CSI-RS is recently introduced to support RS sharing among different REs and to achieve higher spectrum efficiency. One example of such aperiodic CSI-RS is an aperiodic CSI-RS (a aperiodic CSI-RS which is transmitted merely once) which can be transmitted in one-shoot manner in any subframe. Since the aperiodic CSI-RS can be transmitted anywhere in time domain, it does not need configuration by subframe_config. In a case that the eNB is configured with multiple aperiodic CSI-RS resources, it may be indicated, through a dynamic signaling, that one or more aperiodic CSI-RSs are to be transmitted in a certain subframe.

Another example of aperiodic CSI-RS is a multi-shot CSI-RS, which is an aperiodic CSI-RS transmitted multiple times. A period and a subframe offset of the multi-shot CSI-RS still need to be configured by a high-layer signaling and indicated by the IE field of subframe_config; in this way, the multi-shot CSI-RS is transmitted periodically. Transmission of a multi-shot CSI-RS is only performed after it is activated by the eNB, and is stopped when deactivated by the eNB.

With the introduce of the aperiodic CSI-RS, a downlink control signaling for scheduling a data transmission needs to be enhanced. That is, the eNB needs to indicate the UE whether an aperiodic CSI-RS is transmitted and indicate the UE about a configuration of the aperiodic CSI-RS if the aperiodic CSI-RS is transmitted. In this way, the UE may perform PDSCH rate matching correctly.

However, no solution is given to ensure that the UE can perform the PDSCH rate matching correctly after the aperiodic CSI-RS is introduced, so data cannot be transmitted correctly.

SUMMARY

The present disclosure is to provide a method for data transmission, a base station and a terminal, which may solve a problem in relevant technology that data cannot be correctly transmitted with introduce of an aperiodic CSI-RS.

Regarding the above problem, some embodiments of the present disclosure provide a method for data transmission applied to a base station. The method includes:

configuring the number of bits occupied by downlink control information (DCI) used to indicate physical downlink shared channel (PDSCH) scheduling on each of all carriers corresponding to a to-be-scheduled terminal to be N, where N is a maximum number of bits occupied by the DCI that is used to indicate the PDSCH scheduling on a carrier configured with an aperiodic channel state information reference signal (CSI-RS); and constructing scheduling information for indicating the PDSCH scheduling based on the configured DCI, and transmitting the scheduling information to the to-be-scheduled terminal.

Optionally, the configuring the number of bits occupied by the DCI used to indicate the PDSCH scheduling on each of all carriers corresponding to the to-be-scheduled terminal to be N includes:

adding an aperiodic zero-power (ZP) CSI-RS indication field occupying a corresponding number of bits to the DCI of each carrier based on the N.

Optionally, the adding the aperiodic ZP CSI-RS indication field occupying the corresponding number of bits to the DCI of a carrier that is not configured with an aperiodic CSI-RS includes:

padding the aperiodic ZP CSI-RS indication field with values preset between the base station and a terminal, or with self-configured values.

Optionally, for carriers configured with aperiodic CSI-RSs, each state corresponding to values of bits in the aperiodic ZP CSI-RS indication field on each carrier indicates both a CSI process index and a ZP CSI-RS index.

Optionally, before configuring the aperiodic CSI-RS, the method for data transmission further includes:

configuring, by a radio resource control (RRC), the CSI process index and the ZP CSI-RS index corresponding to each state; or predefining, in a system, the CSI process index and the ZP CSI-RS index corresponding to each state.

The present disclosure further provides a method for data transmission applied to a terminal, including:

receiving scheduling information for indicating physical downlink shared channel (PDSCH) scheduling transmitted by a base station, where the number of bits occupied by downlink control information (DCI) in the scheduling information is a maximum number of bits occupied by the DCI that is used to indicate the PDSCH scheduling on a carrier configured with an aperiodic channel state information reference signal (CSI-RS); and performing PDSCH rate matching based on the scheduling information.

Optionally, the scheduling information includes an aperiodic zero-power (ZP) CSI-RS indication field that is newly added to the DCI.

Optionally, in a case that the DCI is DCI of a carrier configured with an aperiodic CSI-RS, the step of performing the PDSCH rate matching based on the scheduling information includes: obtaining values of bits of a part of or all of an area in the scheduling information, where the area is used to indicate the PDSCH rate matching and includes the aperiodic ZP CSI-RS indication field; and performing the PDSCH rate matching based on a state corresponding to the values of the bits.

Optionally, in a case that the DCI is DCI of a carrier not configured with an aperiodic CSI-RS, the performing PDSCH rate matching based on the scheduling information includes: obtaining values of bits of a part of or all of an area in the scheduling information, where the area is used to indicate the PDSCH rate matching and does not include the aperiodic ZP CSI-RS indication field; and performing the PDSCH rate matching based on a state corresponding to the values of the bits.

Optionally, before performing PDSCH rate matching based on the scheduling information, the method for data transmission further includes: decoding the DCI based on the maximum value.

The present disclosure further provides a base station, including: a configuration module, used to configure the number of bits occupied by downlink control information (DCI) used to indicate physical downlink shared channel (PDSCH) scheduling on each of all carriers corresponding to a to-be-scheduled terminal to be N, where N is a maximum number of bits occupied by the DCI that is used to indicate the PDSCH scheduling on a carrier configured with an aperiodic channel state information reference signal (CSI-RS); and a first processing module, configured to construct scheduling information for indicating the PDSCH scheduling based on the configured DCI, and transmit the scheduling information to the to-be-scheduled terminal.

Optionally, the configuration module is used to: add an aperiodic zero-power (ZP) CSI-RS indication field occupying a corresponding number of bits to the DCI of each carrier based on the N.

Optionally, for a carrier that is not configured with an aperiodic CSI-RS, the configuration module includes a padding sub-module, configured to pad the aperiodic ZP CSI-RS indication field with values preset between the base station and a terminal, or with self-configured values.

Optionally, for carriers configured with aperiodic CSI-RSs, each state corresponding to values of bits in the aperiodic ZP CSI-RS indication field on each carrier indicates both a CSI process index and a ZP CSI-RS index.

Optionally, the base station further includes a second processing module used to: configure, by a radio resource control (RRC), the CSI process index and the ZP CSI-RS index corresponding to each state or predefine, in a system, the CSI process index and the ZP CSI-RS index corresponding to each state, before the aperiodic CSI-RS is configured.

The present disclosure further provides a terminal, including: a receiving module, used to receive scheduling information for indicating a physical downlink shared channel (PDSCH) scheduling transmitted by a base station, where the number of bits occupied by downlink control information (DCI) in the scheduling information is a maximum number of bits occupied by the DCI that is used to indicate the PDSCH scheduling on a carrier configured with an aperiodic channel state information reference signal (CSI-RS); and a matching module, used to perform PDSCH rate matching based on the scheduling information.

Optionally, the scheduling information includes an aperiodic zero-power (ZP) CSI-RS indication field that is newly added to the DCI.

Optionally, in a case that the DCI is DCI of a carrier configured with an aperiodic CSI-RS, the matching module includes: a first obtaining sub-module used to obtain values of bits of a part of or all of an area in the scheduling information, where the area is used to indicate the PDSCH rate matching and includes the aperiodic ZP CSI-RS indication field; and a first matching sub-module used to perform the PDSCH rate matching based on a state corresponding to the values of the bits.

Optionally, in a case that the DCI is DCI of a carrier not configured with an aperiodic CSI-RS, the matching module includes: a second obtaining sub-module used to obtain values of bits of a part of or all of an area in the scheduling information, where the area is used to indicate the PDSCH rate matching and does not include the aperiodic ZP CSI-RS indication field; and a second matching sub-module used to perform the PDSCH rate matching based on a state corresponding to the values of the bits.

Optionally, the terminal further includes a decoding module, used to decode the DCI based on the maximum value before the matching module performs the PDSCH rate matching based on the scheduling information.

The present disclosure further provides a base station, including: a processor, and a memory and a transceiver that are connected to the processor. The memory is used to store programs and data to be used by the processor when executing operations. When calling and executing the programs and data stored in the memory, the processor performs the following processes: configuring the number of bits occupied by downlink control information (DCI) used to indicate physical downlink shared channel (PDSCH) scheduling on each of all carriers corresponding to a to-be-scheduled terminal to be N, where N is a maximum number of bits occupied by the DCI that is used to indicate the PDSCH scheduling on a carrier configured with an aperiodic channel state information reference signal (CSI-RS); and constructing scheduling information for indicating the PDSCH scheduling based on the configured DCI, and transmitting the scheduling information to the to-be-scheduled terminal. The transceiver is used to receive and transmit data under control of the processor.

The present disclosure further provides a terminal, including: a processor, and a memory and a transceiver that are connected to the processor. The memory is used to store programs and data to be used by the processor when executing operations. When calling and executing the programs and data stored in the memory, the processor performs the following processes: receiving, via the transceiver, scheduling information for indicating a physical downlink shared channel (PDSCH) scheduling transmitted by a base station, where the number of bits occupied by downlink control information (DCI) in the scheduling information is a maximum number of bits occupied by DCI that is of a carrier configured with an aperiodic channel state information reference signal (CSI-RS) and is used to indicate the PDSCH scheduling; and performing PDSCH rate matching based on the scheduling information. The transceiver is used to receive and transmit data under control of the processor.

Beneficial effects of the above technical solutions of the present disclosure are described as follows. The numbers of the bits occupied by the pieces of DCI used to indicate the PDSCH scheduling on the all carriers corresponding to the to-be-scheduled terminal are set to be N, such that the terminal only needs to obtain a size of one kind of DCI by blindly decoding the DCI no matter whether the carriers are configured with aperiodic CSI-RSs. In this way, computation complexity of the terminal is reduced; a search area for a size of each piece of DCI and flexibility of the PDSCH scheduling are ensured; and it is ensured, with the introduce of aperiodic CSI-RS, that the UE can perform PDSCH rate matching accurately and data can be transmitted correctly.

DETAILED DESCRIPTION

In order to make technical problems, technical solutions and advantages to be solved in embodiments of the present disclosure clearer, specific embodiments will be described hereinafter in detail in conjunction with drawings.

Multiple solutions are provided in the present disclosure for a problem that data cannot be transmitted correctly with the introduce of aperiodic CSI-RS in relevant technology. These solutions are specified as follows.

Figure 1:
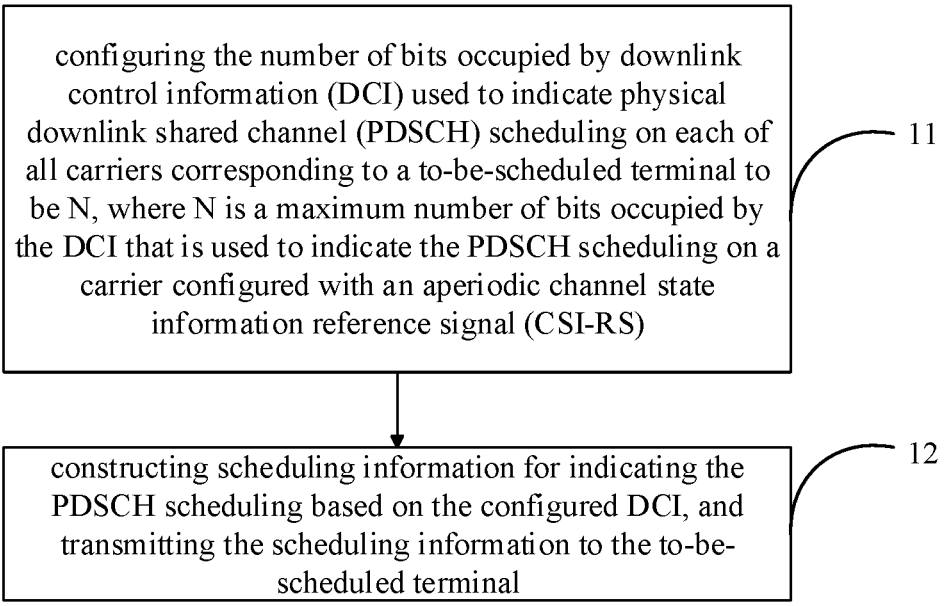
FIG. 1 is a schematic flow chart of a method for data transmission according to some optional embodiments of the present disclosure.

In some optional embodiments, as shown in FIG. 1, a method for data transmission is provided, which is applicable to a base station. The method for data transmission includes step 11 and step 12. Step 11 includes: configuring the number of bits occupied by downlink control information (DCI) used to indicate physical downlink shared channel (PDSCH) scheduling on each of all carriers corresponding to a to-be-scheduled terminal to be N, where N is a maximum number of bits occupied by the DCI that is used to indicate the PDSCH scheduling on a carrier configured with an aperiodic channel state information reference signal (CSI-RS). Step 12 includes: constructing scheduling information for indicating the PDSCH scheduling based on the configured DCI, and transmitting the scheduling information to the to-be-scheduled terminal.

Here, N is involved for purpose of an accurate description of configuring the numbers of the bits occupied by the pieces of DCI of the all carriers corresponding to the to-be-scheduled terminal and used to indicate the PDSCH scheduling to be the same. N does not have any particular physical meaning. N is preferred to be a positive integer.

In the method for data transmission according to the embodiments of the present disclosure, the numbers of the bits occupied by the pieces of DCI used to indicate the PDSCH scheduling on the all carriers corresponding to the to-be-scheduled terminal are set to be N, such that the terminal only needs to obtain a size of one kind of DCI by blindly decoding the DCI no matter whether the carriers are configured with aperiodic CSI-RSs. In this way, computation complexity of the terminal is reduced; a search area for a size of each piece of DCI and flexibility of the PDSCH scheduling are ensured; and it is ensured, with the introduce of aperiodic CSI-RS, that the UE can perform PDSCH rate matching accurately and data can be transmitted correctly.

The above solution may also be understood as follows. A maximum number of bits occupied by DCI that is of a carrier configured with an aperiodic CSI-RS and is used to indicate a PDSCH scheduling is obtained; numbers of bits occupied by pieces of DCI of all carriers corresponding to a to-be-scheduled terminal and used to indicate the PDSCH scheduling are configured to be the same according to the maximum number; and scheduling information for indicating the PDSCH scheduling is constructed based on the configured pieces of DCI and the scheduling information is transmitted to the to-be-scheduled terminal.

Specifically, an approach of configuring the number of bits occupied by the DCI used to indicate the PDSCH scheduling on each of all carriers corresponding to the to-be-scheduled terminal to be N includes: adding an aperiodic ZP CSI-RS indication field occupying a corresponding number of bits to DCI of each carrier based on N.

N may be set according to actual needs and is not limited herein.

In actual application, according to some embodiments, for a carrier that is not configured with an aperiodic CSI-RS, a step of adding an aperiodic ZP CSI-RS indication field occupying a corresponding number of bits to DCI of such carrier includes: padding the aperiodic ZP CSI-RS indication field with values pre-agreed between the base station and the terminal or with self-configured values.

Specific padding cases are enumerated as follows.

In a first case, arbitrary values are utilized to pad. That is, values for preset bits are not defined in a system and the base station (eNB) selects arbitrary values to pad.

In a second case, random values are utilized to pad. That is, values generated by the base station randomly are utilized as values for preset bits.

In a third case, preset values are utilized to pad. That is, values for preset bits are defined clearly, e.g., all defined to be 0 or all defined to be 1.

In a fourth case, radio resource control (RRC) configured values are utilized to pad. That is, values for preset bits are configured by an RRC (through an RRC signaling).

In a fifth case, reserved state indicating values are utilized to pad. That is, values for preset bits are preset values for a state which is not used by the system.

In a sixth case, preset values for a corresponding state where no rate matching is performed are utilized to pad. That is, values for preset bits are values for a state where no rate matching is performed with respect to the area, which are negotiated by the base station and the terminal and are recognizable by the terminal.

It is noted here, in a case where the aperiodic ZP CSI-RS indication field is padded with self-configured values, the base station may notify a corresponding terminal via an RRC signaling such that the terminal may perform a subsequent processing.

Aperiodic or aperiodic ZP CSI-RSs corresponding to the PDSCH rate matching are configured respectively in all CSI processes of all carriers. In some embodiments, for carriers configured with aperiodic CSI-RSs, each state corresponding to values of bits in the aperiodic ZP CSI-RS indication field on each carrier indicates both a CSI process index and a ZP CSI-RS index.

Each group of one CSI process index and one ZP-CSI-RS index, which corresponds to one state of the aperiodic ZP CSI-RS indication field, may be pre-defined in the system or configured by the RRC. Optionally, before configuring the aperiodic CSI-RS, the method for data transmission further includes: configuring, by the RRC, the CSI process index and the ZP CSI-RS index corresponding to each state; or predefining, in the system, the CSI process index and the ZP CSI-RS index corresponding to each state.

In view of the above, with the method for data transmission according to some optional embodiments of the present disclosure, data can be transmitted correctly after the aperiodic CSI-RS is introduced.

Figure 2:
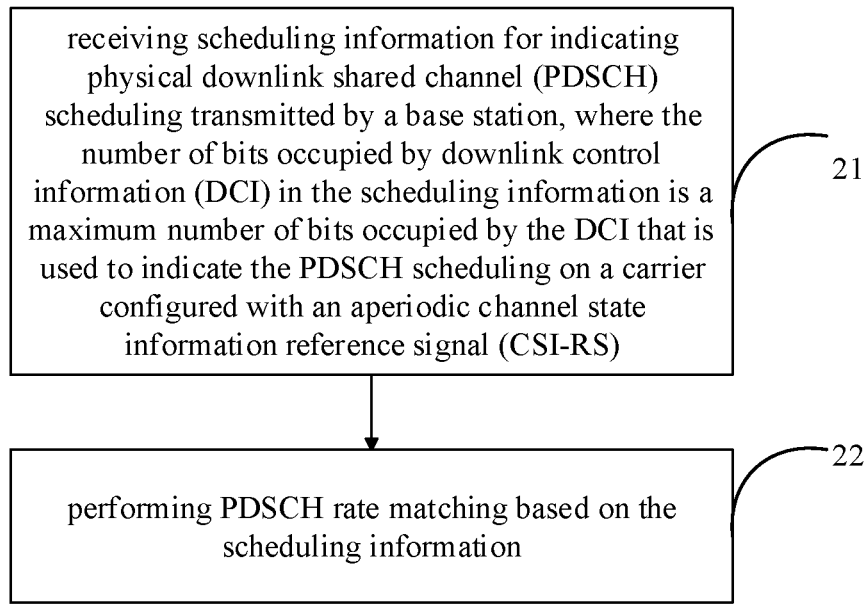
FIG. 2 is a schematic flow chart of a method for data transmission according to some optional embodiments of the present disclosure.

In some optional embodiments, as shown in FIG. 2, a method for data transmission is provided, which is applicable to a terminal. The method for data transmission includes step 21 and step 22. Step 21 includes: receiving scheduling information for indicating physical downlink shared channel (PDSCH) scheduling transmitted by a base station, where the number of bits occupied by downlink control information (DCI) in the scheduling information is a maximum number of bits occupied by the DCI that is used to indicate the PDSCH scheduling on a carrier configured with an aperiodic channel state information reference signal (CSI-RS). Step 22 includes: performing PDSCH rate matching based on the scheduling information.

In the method for data transmission according to the embodiments of the present disclosure, the scheduling information for indicating the PDSCH scheduling transmitted by the base station is received, and the number of bits occupied by DCI in the scheduling information is the maximum number of bits occupied by DCI that is of the carrier configured with the aperiodic CSI-RS and is used to indicate the PDSCH scheduling, such that when performing the PDSCH rate matching based on the scheduling information, it is only necessary to obtain a size of one kind of DCI through a blind analysis no matter whether the carriers are configured with aperiodic CSI-RSs. In this way, computation complexity is reduced; a search area for a size of each piece of DCI and flexibility of the PDSCH scheduling are ensured; and it is ensured, with the introduce of aperiodic CSI-RS, that the UE can perform PDSCH rate matching accurately and data can be transmitted correctly.

It should be understood that received DCI of carriers occupy a same number of bits, which is equal to the above-mentioned maximum number.

Furthermore, the scheduling information includes an aperiodic ZP CSI-RS indication field that is newly added to the DCI.

For a carrier configured with an aperiodic CSI-RS, that is, in a case that the DCI is DCI of the carrier configured with the aperiodic CSI-RS, the step of performing the PDSCH rate matching based on the scheduling information includes: obtaining values of bits of a part of or all of an area in the scheduling information, where the area is used to indicate the PDSCH rate matching and includes the aperiodic ZP CSI-RS indication field; and performing the PDSCH rate matching based on a state corresponding to the values of the bits. Hence, in comparison with an existing scheme, embodiments under the case herein involves PDSCH rate matching with respect to the newly added aperiodic ZP CSI-RS indication field.

For a carrier not configured with an aperiodic CSI-RS, that is, in a case that the DCI is DCI of a carrier not configured with the aperiodic CSI-RS, the step of performing the PDSCH rate matching based on the scheduling information includes: obtaining values of bits of a part of or all of an area in the scheduling information, where the area is used to indicate the PDSCH rate matching and does not include the aperiodic ZP CSI-RS indication field; and performing the PDSCH rate matching based on a state corresponding to the values of the bits. Hence, embodiments under the case herein does not involve PDSCH rate matching with respect to the newly added aperiodic ZP CSI-RS indication field.

Corresponding to specific cases how the base station fills the aperiodic ZP CSI-RS indication field, following two strategies are provided according to some embodiments In a first strategy, in a case that the base station fills the aperiodic ZP CSI-RS indication field with any of arbitrary values, random values, preset values, RRC configured values or reserved state indicating values, the step of obtaining the values of bits of the part of or all of the area in the scheduling information, where the area is used to indicate the PDSCH rate matching and does not include the aperiodic ZP CSI-RS indication field includes: not obtaining values of bits in the aperiodic ZP CSI-RS indication field. Alternatively, no recognition is performed on a state corresponding to the values of the bits in the aperiodic ZP CSI-RS indication field and no PDSCH rate matching is performed with respect to the aperiodic ZP CSI-RS indication field.

In a second strategy, in a case that the base station fills the aperiodic ZP CSI-RS indication field with preset values for a corresponding state where no rate matching is performed, the step of obtaining the values of bits of the part of or all of the area in the scheduling information, where the area is used to indicate the PDSCH rate matching and does not include the aperiodic ZP CSI-RS indication field includes: recognizing the values for the corresponding state where no rate matching is performed from the aperiodic ZP CSI-RS indication field; and not performing any PDSCH rate matching. That is to say, a state corresponding to values of bits in the aperiodic ZP CSI-RS indication field is recognized but no PDSCH rate matching is performed with respect to the aperiodic ZP CSI-RS indication field.

Furthermore, before performing the PDSCH rate matching based on the scheduling information, the method for data transmission includes: decoding the DCI based on the maximum value, which may enhance a processing speed of the terminal.

In view of the above, with the method for data transmission according to some optional embodiments of the present disclosure, data can be transmitted correctly after the introduce of aperiodic CSI-RS.

A method for data transmission according to some embodiments of the present disclosure is detailed hereinafter in conjunction of a base station and a terminal.

A solution is described in brief as follows. In a case that a UE configures an aperiodic CSI-RS on any activated/configured carriers and cross-carrier scheduling is enabled, a size of DCI used for a downlink PDSCH scheduling and of any carrier (no matter whether such carrier is configured with any aperiodic CSI-RS) needs to be equal to a maximum size of DCI that is of a carrier configured with an aperiodic CSI-RS and is used to indicate PDSCH rate matching.

Specifically, if a format of DCI for the PDSCH scheduling in a relevant system has a payload of N bits, in order to perform the PDSCH rate matching in consideration of the aperiodic CSI-RS, it is necessary to add an aperiodic ZP CSI-RS indication field occupying n bits to the DCI for the PDSCH rate matching. In case of performing the PDSCH scheduling based on DCI of a carrier configured with the aperiodic CSI-RS, the aperiodic CSI-RS indication field occupying n bits is filled in the DCI format of N bits and a total size of N+n bits is obtained. In case of performing the PDSCH scheduling based on DCI of a carrier not configured with the aperiodic CSI-RS, the aperiodic CSI-RS indication field occupying n bits is filled in the DCI format of N bits, and the DCI needs to be added with n bits, so a size of the DCI is N+n bits.

Several possible cases for the added n bits are described as follows.

(1) Values of the n bits are not defined in the system; for example, the eNB selects arbitrary values to fill the n bits. Since the carrier is not configured with any aperiodic CSI-RS, the UE follows an existing approach for PDSCH rate matching and no additional PDSCH rate matching is involved. The UE discards the added n bits after the DCI is decoded.

(2) Values of the n bits are clearly defined, such as all 0 or all 1. The UE follows an existing approach for PDSCH rate matching and no additional PDSCH rate matching is involved. The UE discards the added n bits after the DCI is decoded.

(3) Values of the n bits are RRC-configured. The UE follows an existing approach for PDSCH rate matching and no additional PDSCH rate matching is involved. The UE discards the added n bits after the DCI is decoded.

(4) Values of the n bits are reserved. The UE follows an existing approach for PDSCH rate matching and no additional PDSCH rate matching is involved. The UE discards the added n bits after the DCI is decoded.

(5) The UE may not receive an aperiodic ZP CSI-RS indication field occupying n bits, where a state indicated by such field is not equivalent to "no aperiodic ZP CSI-RS". From perspective of the eNB, the eNB needs to indicate "no aperiodic ZP CSI-RS" in the n bit aperiodic ZP CSI-RS indication field. Alternatively, it may be understood that the base station and the terminal agree on a state value, and the terminal only receives or recognizes the aperiodic ZP CSI-RS indication field filled with the state value.

In view of the above, for the UE configured with multiple carriers and cross-carrier scheduling, the embodiments of the present disclosure come up with a mechanism of PDSCH rate matching performed in consideration of the aperiodic CSI-RS. In case of not using the mechanism of the present disclosure, the size of the DCI may not be fixed, the UE needs to blindly decode the DCI whose payloads may vary dynamically, thereby increasing UE complexity or limiting the downlink scheduling.

In addition, in a case that aperiodic or aperiodic ZP CSI-RSs used for the PDSCH rate matching are configured respectively in all CSI processes of all carriers, each state of the n-bit ZP CSI-RS indication field for the PDSCH rate matching needs to indicate both a CSI process index and a ZP CSI-RS index.

Each group of a CSI process index and a ZP-CSI-RS index, which corresponds to one state of the n-bit ZP CSI-RS indication field, may be pre-defined in the system or configured by the RRC.

For example, a system parameter in relevant technology occupies 2 bits and has following four states for indicating the PDSCH rate matching performed in consideration of the ZP CSI-RS.

In state 0, there is no aperiodic ZP CSI-RS.

In state 1, an aperiodic ZP CSI-RS is configured by a first RRC.

In state 2, an aperiodic ZP CSI-RS is configured by a second RRC.

In state 3, an aperiodic ZP CSI-RS is configured by a third RRC.

States 1, 2, 3 correspond to their preset configurations respectively.

In some embodiments, four states of the 2-bit ZP CSI-RS indication field may be configured by the RRC as follows:
state 0: no ZP CSI-RS indication;
state 1: a first RRC configured {CSI-process index, ZP CSI-RS index};
state 2: a second RRC configured {CSI-process index, ZP CSI-RS index}; and
state 3: a third RRC configured {CSI-process index, ZP CSI-RS index}.

Four states of the 2-bit ZP CSI-RS indication field may be pre-defined in the system as follows:
state 0: no ZP CSI-RS indication;
state 1: first RRC configured ZP CSI-RS of a first CSI process (or pre-defined CSI process);
state 2: second RRC configured ZP CSI-RS of a first CSI process (or pre-defined CSI process); and
state 3: third RRC configured ZP CSI-RS of a first CSI process (or pre-defined CSI process).

In view of the above, with the method for data transmission according to embodiments of the present disclosure, the problem in relevant technology that data cannot be correctly transmitted with the introduce of aperiodic CSI-RS is solved.

Figure 3:
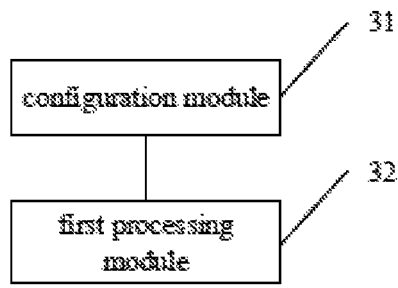
FIG. 3 is a schematic structural diagram of a base station according to some optional embodiments of the present disclosure.

A base station according to some optional embodiments of the present disclosure, as shown in FIG. 3, includes a configuration module 31 and a first processing module 32. The configuration module 31 is used to configure the number of bits occupied by downlink control information (DCI) used to indicate physical downlink shared channel (PDSCH) scheduling on each of all carriers corresponding to a to-be-scheduled terminal to be N, where N is a maximum number of bits occupied by the DCI that is used to indicate the PDSCH scheduling on a carrier configured with an aperiodic channel state information reference signal (CSI-RS). The first processing module 32 is used to construct scheduling information for indicating the PDSCH scheduling based on the configured DCI, and transmit the scheduling information to the to-be-scheduled terminal.

Here, N is involved for purpose of an accurate description of configuring the numbers of the bits occupied by the pieces of DCI of the all carriers corresponding to the to-be-scheduled terminal and used to indicate the PDSCH scheduling to be the same. N does not have any particular physical meaning. N is preferred to be a positive integer.

With the base station according to the embodiments of the present disclosure, the numbers of the bits occupied by the pieces of DCI of the all carriers corresponding to the to-be-scheduled terminal and used to indicate the PDSCH scheduling are set to be N, such that the terminal only needs to obtain a size of one kind of DCI through a blind analysis no matter whether the carriers are configured with aperiodic CSI-RSs. In this way, computation complexity of the terminal is reduced; a search area for a size of each piece of DCI and flexibility of the PDSCH scheduling are ensured; and it is ensured, with the introduce of aperiodic CSI-RS, that the UE can perform PDSCH rate matching accurately and data can be transmitted correctly.

Optionally, the configuration module is used to add an aperiodic ZP CSI-RS indication field occupying a corresponding number of bits to DCI of each carrier based on N. N may be set according to actual needs and is not limited herein.

In actual application, according to some embodiments, for a carrier that is not configured with an aperiodic CSI-RS, the configuration module includes: a filling sub-module, used to fill the aperiodic ZP CSI-RS indication field with values preset between the base station and the terminal or with self-configured values.

Aperiodic or aperiodic ZP CSI-RSs corresponding to the PDSCH rate matching are configured respectively in all CSI processes of all carriers. In some embodiments, for carriers configured with aperiodic CSI-RSs, each state corresponding to values of bits in the aperiodic ZP CSI-RS indication field on each carrier indicates both a CSI process index and a ZP CSI-RS index.

Each group of CSI process index and ZP-CSI-RS index, which corresponds to one state of the aperiodic ZP CSI-RS indication field, may be pre-defined in the system or configured by the RRC. Optionally, the base station further includes a second processing module, used to: configure, by the RRC, the CSI process index and the ZP CSI-RS index corresponding to each state or predefine, in the system, the CSI process index and the ZP CSI-RS index corresponding to each state, before the aperiodic CSI-RS is configured.

In view of the above, with the base station according to some optional embodiments of the present disclosure, data can be transmitted correctly after the introduce of aperiodic CSI-RS.

It should be noted, the base station according to the optional embodiments is a base station corresponding to the method for data transmission applied to the base station side according to foregoing embodiments, so all embodiments directed to the method for data transmission applied to the base station side are applicable to the base station, and same or similar beneficial effects can be achieved.

Figure 4:
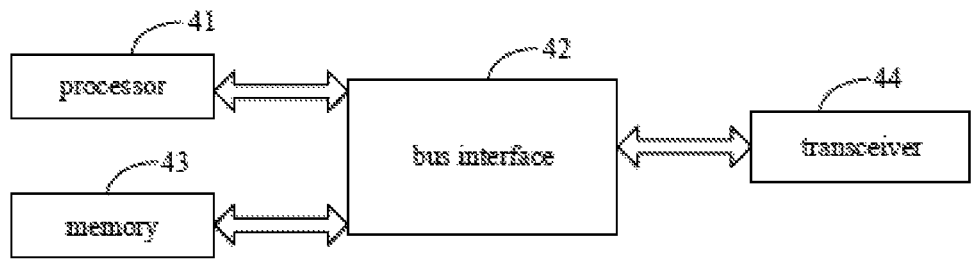
FIG. 4 is a schematic structural diagram of a base station according to some optional embodiments of the present disclosure.

As shown in FIG. 4, a base station according to some embodiments includes: a processor 41, and a memory 43 connected to the processor 41 via a bus interface 42. The memory 43 is used to store programs and data to be used by the processor 41 when executing operations. When calling and executing the programs and data stored in the memory 43, the processor 41 performs the following processes: configuring the number of bits occupied by downlink control information (DCI) used to indicate physical downlink shared channel (PDSCH) scheduling on each of all carriers corresponding to a to-be-scheduled terminal to be N, where N is a maximum number of bits occupied by the DCI that is used to indicate the PDSCH scheduling on a carrier configured with an aperiodic channel state information reference signal (CSI-RS); and constructing scheduling information for indicating the PDSCH scheduling based on the configured DCI, and transmitting the scheduling information to the to-be-scheduled terminal. The transceiver 44 is connected with the bus interface 42 and is used to receive and transmit data under control of the processor 41.

It should be noted that, in FIG. 4, a bus architecture may include an arbitrary quantity of buses and bridges connected to each other. Various circuits of one or more processors represented by the processor 41 are coupled to various circuits of a memory represented by the memory 43 via the bus architecture. The bus architecture may further couple other circuits together, such as a periphery component, a voltage stabilizer and a power management circuit, which is well known in the art and is therefore not repeated herein. The bus interface provides an interface. The transceiver 44 may be multiple elements such as multiple receivers and multiple transmitters. The transceiver 44 provides a unit used to communicate with other devices on a transmission medium. The processor 41 is in charge of management of the bus architecture and common processings. The memory 43 may store data used by the processor 41 when executing operations.

It can be understood by the skilled in the art, all or a part of steps for implementing the foregoing embodiment may be accomplished by hardware or by hardware instructed by computer program. The computer program includes instructions to execute a part of or all of the steps of the above-mentioned method. The computer program may be stored in a readable storage medium, where the storage medium may be in any form.

Figure 5:
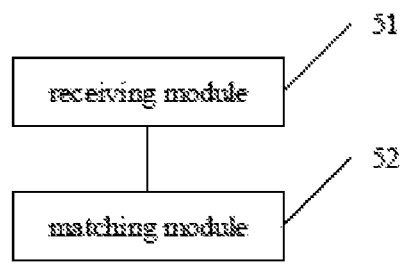
FIG. 5 is a schematic structural diagram of a terminal according to some optional embodiments of the present disclosure.

As shown in FIG. 5, a terminal according to some embodiments of the present disclosure includes a receiving module 51 and a matching module 52. The receiving module 51 is used to receive scheduling information for indicating a PDSCH scheduling transmitted by a base station. The number of bits occupied by DCI in the scheduling information is a maximum number of bits occupied by DCI that is of a carrier configured with an aperiodic CSI-RS and is used to indicate the PDSCH scheduling. The matching module 52 is used to perform PDSCH rate matching based on the scheduling information.

With the terminal according to the embodiments of the present disclosure, the scheduling information for indicating the PDSCH scheduling transmitted by the base station is received, and the number of bits occupied by DCI in the scheduling information is the maximum number of bits occupied by DCI that is of the carrier configured with the aperiodic CSI-RS and is used to indicate the PDSCH scheduling, such that when performing the PDSCH rate matching based on the scheduling information, it is only necessary to obtain a size of one kind of DCI through a blind analysis no matter whether the carriers are configured with aperiodic CSI-RSs. In this way, computation complexity is reduced; a search area for a size of each piece of DCI and flexibility of the PDSCH scheduling are ensured; and it is ensured, with the introduce of aperiodic CSI-RS, that the UE can perform PDSCH rate matching accurately and data can be transmitted correctly.

It should be understood that received DCI of carriers occupy a same number of bits, which is equal to the above-mentioned maximum number.

Furthermore, the scheduling information includes an aperiodic ZP CSI-RS indication field that is newly added to the DCI.

For a carrier configured with an aperiodic CSI-RS, that is, in a case that the DCI is DCI of the carrier configured with the aperiodic CSI-RS, the matching module includes: a first obtaining sub-module used to obtain values of bits of a part of or all of an area in the scheduling information, where the area is used to indicate the PDSCH rate matching and includes the aperiodic ZP CSI-RS indication field; and a first matching sub-module used to perform the PDSCH rate matching based on a state corresponding to the values of the bits. Hence, in comparison with an existing scheme, embodiments under the case herein involves PDSCH rate matching with respect to the newly added aperiodic ZP CSI-RS indication field.

For a carrier not configured with an aperiodic CSI-RS, that is, in a case that the DCI is DCI of a carrier not configured with the aperiodic CSI-RS, the matching module includes: a second obtaining sub-module used to obtain values of bits of a part of or all of an area in the scheduling information, where the area is used to indicate the PDSCH rate matching and does not include the aperiodic ZP CSI-RS indication field; and a second matching sub-module used to perform the PDSCH rate matching based on a state corresponding to the values of the bits. Hence, embodiments under the case herein does not involve PDSCH rate matching with respect to the newly added aperiodic ZP CSI-RS indication field.

The terminal further includes a decoding module, used to decode the DCI based on the maximum value before the matching module performs the PDSCH rate matching based on the scheduling information, which may enhance a processing speed of the terminal.

In view of the above, with the terminal according to some optional embodiments of the present disclosure, data can be transmitted correctly after the introduce of aperiodic CSI-RS.

It should be noted, the terminal according to the optional embodiments is a base station corresponding to The method for data transmission applied to the terminal side according to foregoing embodiments, so all embodiments directed to The method for data transmission applied to the terminal side are applicable to the terminal, and same or similar beneficial effects can be achieved.

Figure 6:
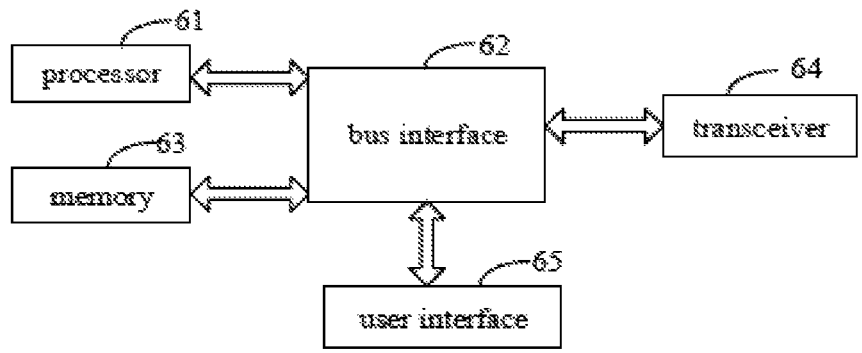
FIG. 6 is a schematic structural diagram of a terminal according to some optional embodiments of the present disclosure.

As shown in FIG. 6, a terminal according to some embodiments includes: a processor 61, and a memory 63 connected to the processor 61 via a bus interface 62. The memory 63 is used to store programs and data to be used by the processor 61 when executing operations. When calling and executing the programs and data stored in the memory 63, the processor 61 performs the following processes: receiving, via a transceiver 64, scheduling information for indicating a PDSCH scheduling transmitted by a base station, where the number of bits occupied by DCI in the scheduling information is a maximum number of bits occupied by DCI that is of a carrier configured with an aperiodic CSI-RS and is used to indicate the PDSCH scheduling; and performing PDSCH rate matching based on the scheduling information. The transceiver 64 is connected with the bus interface 62 and is used to receive and transmit data under control of the processor 61.

It should be noted, in FIG. 6, a bus architecture may include an arbitrary quantity of buses and bridges connected to each other. Various circuits of one or more processors represented by the processor 61 are coupled to various circuits of a memory represented by the memory 63 via the bus architecture. The bus architecture may further couple other circuits together, such as a periphery component, a voltage stabilizer and a power management circuit, which is well known in the art and is therefore not repeated herein. The bus interface provides an interface. The transceiver 44 may be multiple elements such as multiple receivers and multiple transmitters. The transceiver 64 provides a unit used to communicate with other devices on a transmission medium. For different terminals, a user interface 65 may be a interface for internally or externally connecting necessary devices including a keypad, a loudspeaker, a microphone, an operating lever and so on. The processor 61 is in charge of management of the bus architecture and common processings. The memory 63 may store data used by the processor 61 when executing operations.

It can be understood by the skilled in the art, all or a part of steps for implementing the foregoing embodiment may be accomplished by hardware or by hardware instructed by computer program. The computer program includes instructions to execute a part of or all of the steps of the above-mentioned method. The computer program may be stored in a readable storage medium, where the storage medium may be in any form.

It should be noted that many functional components are called as modules or sub-modules in the description herein, to particularly strengthen their independent implementing manners.

In embodiments of the present disclosure, the modules/sub-modules/units may be implemented through software, to facilitate being executed by various kinds of processors. For example, an identified executable code module may include one or multiple physical or logic blocks instructed by a computer, such as constructed objects, processes or functions. Despite all this, executable codes of the identified module do not need to be together physically and they may include different instructions stored at different positions. In case of integrated together logically, these instructions form the module and achieve a specified objective of the module.

In fact, the executable code module may have one single instruction or multiple instructions, or even the multiple instructions may be distributed in different code segments, distributed in different programs and distributed in multiple memory devices. Correspondingly, processing data may be identified within the module, implemented in any appropriate manner and organized within a data structure of any appropriate type. The processing data may be collected as a single data set, or may be distributed at different positions (such as distributed in different memory devices), or may at least partially function as an electric signal and exist in a system or a network.

Considering current hardware process level, the modules may be implemented using software. Regardless of the cost, the skilled in the art may build hardware circuits to implement corresponding functions. The hardware circuits may normally include very large scale integrated (VLSI) circuits, gate arrays, existing semiconductors such as logic chips and transistors, or other independent elements. The modules may further be realized using programmable hardware devices such as field-programmable gate arrays, programmable array logic and programmable logic devices.

Optional embodiments are described above. It should be noted that various improvements and polishment can be made by the ordinary skilled in the art without departing from the principle of the present disclosure. The improvements and polishment all fall within the protection scope of the present disclosure.

What is claimed is:

1. A method for data transmission, applied to a base station, comprising:
  configuring a number of bits occupied by downlink control information (DCI) to be N, the DCI being used to indicate physical downlink shared channel (PDSCH) scheduling on each of all carriers corresponding to a to-be-scheduled terminal, wherein the all carriers corresponding to the to-be-scheduled terminal comprise a carrier not configured with an aperiodic CDI-RS, the carrier not configured with an aperiodic CSI-RS comprises a carrier that is configured with a periodic CSI-RS, and/or a carrier that is configured with a semi-persistent CSI-RS, and/or a carrier that is configured with no CSI-RS, and N is a maximum number of bits occupied by the DCI that is used to indicate the PDSCH scheduling on a carrier configured with an aperiodic channel state information reference signal (CSI-RS); and constructing scheduling information for indicating the PDSCH scheduling based on the configured DCI, and transmitting the scheduling information to the to-be-scheduled terminal, wherein the configuring the number of bits occupied by the DCI to be N, the DCI being used to indicate the PDSCH scheduling on each of all carriers corresponding to a to-be-scheduled terminal, comprises: adding an aperiodic zero-power (ZP) CSI-RS indication field occupying a corresponding number of bits to the DCI of each carrier based on the N; and wherein for the carrier not configured with an aperiodic CSI-RS, the adding the aperiodic ZP CSI-RS indication field occupying the corresponding number of bits to the DCI of each carrier comprises: the base station padding the aperiodic ZP CSI-RS indication field with values preset between the base station and a terminal, or with values configured by the base station.

2. The method for data transmission according to claim 1, wherein the all carriers corresponding to the to-be-scheduled terminal further comprise a carrier configured with an aperiodic CSI-RS, and for the carrier configured with an aperiodic CSI-RS, each state corresponding to values of bits in the aperiodic ZP CSI-RS indication field on each carrier indicates both a CSI process index and a ZP CSI-RS index.

3. The method for data transmission according to claim 2, wherein before configuring the aperiodic CSI-RS, the method for data transmission further comprises:
configuring, by a radio resource control (RRC), the CSI process index and the ZP CSI-RS index corresponding to each state; or
predefining, in a system, the CSI process index and the ZP CSI-RS index corresponding to each state.

4. The method according to claim 1, wherein the all carriers corresponding to the to-be-scheduled terminal further comprise a carrier configured with an aperiodic CSI-RS, and for the carrier configured with an aperiodic CSI-RS, each state corresponding to values of bits in the aperiodic ZP CSI-RS indication field on each carrier indicates a ZP CSI-RS index.

5. A method for data transmission, applied to a terminal corresponding to a plurality of carriers, comprising:
receiving scheduling information for indicating physical downlink shared channel (PDSCH) scheduling transmitted by a base station, wherein a number of bits occupied by downlink control information (DCI) in the scheduling information for each of all the plurality of carriers is N, the DCI comprises a DCI of a carrier configured with an aperiodic CSI-RS and a carrier not configured with an aperiodic CSI-RS, and N is a maximum number of bits occupied by a DCI that is used to indicate the PDSCH scheduling on a carrier configured with an aperiodic channel state information reference signal (CSI-RS); and
performing PDSCH rate matching based on the scheduling information, wherein the scheduling information comprises an aperiodic zero-power (ZP) CSI-RS indication field that is newly added to the DCI; and wherein in a case that the DCI is a DCI of the carrier configured with an aperiodic CSI-RS, the performing PDSCH rate matching based on the scheduling information comprises:
obtaining values of bits of a part of or all of an area in the scheduling information, wherein the area is used to indicate the PDSCH rate matching and comprises the aperiodic ZP CSI-RS indication field; and
performing the PDSCH rate matching based on a state corresponding to the values of the bits;

and, wherein in a case that the DCI is the DCI of the carrier not configured with an aperiodic CSI-RS, and the carrier not configured with an aperiodic CSI-RS comprises a carrier that is configured with a periodic CSI-RS, and/or a carrier that is configured with a semi-persistent CSI-RS, and/or a carrier that is configured with no CSI-RS, the performing PDSCH rate matching based on the scheduling information comprises:
obtaining values of bits of a part of or all of an area in the scheduling information, wherein the area is used to indicate the PDSCH rate matching and does not comprise the aperiodic ZP CSI-RS indication field; and
performing the PDSCH rate matching based on a state corresponding to the values of the bits.

6. The method for data transmission according to claim 5, wherein before performing PDSCH rate matching based on the scheduling information, the method for data transmission further comprises:
decoding the DCI based on the maximum number of bits.

7. A base station, comprising:
a processor, and a memory connected to the processor, wherein the memory is configured to store programs and data to be used by the processor when executing operations, and when calling and executing the programs and data stored in the memory, the processor is configured to:
configure a number of bits occupied by downlink control information (DCI) to be N, the DCI being used to indicate physical downlink shared channel (PDSCH) scheduling on each of all carriers corresponding to a to-be-scheduled terminal, wherein the all carriers corresponding to the to-be-scheduled terminal comprise carrier not configured with an aperiodic CSI-RS, the carrier not configured with an aperiodic CSI-RS comprises a carrier that is configured with a periodic CSI-RS, and/or a carrier that is configured with a semi-persistent CSI-RS, and/or a carrier that is configured with no CSI-RS, and N is a maximum number of bits occupied by the DCI that is used to indicate the PDSCH scheduling on a carrier configured with an aperiodic channel state information reference signal (CSI-RS); and
construct scheduling information for indicating the PDSCH scheduling based on the configured DCI, and transmit the scheduling information to the to-be-scheduled terminal, wherein the processor is configured to: add an aperiodic zero-power (ZP) CSI-RS indication field occupying a corresponding number of bits to the DCI of each carrier based on the N; and wherein for the carrier that is not configured with an aperiodic CSI-RS, the processor is configured to pad the aperiodic ZP CSI-RS indication field with values preset between the base station and a terminal, or with values configured by the base station.

8. The base station according to claim 7, wherein the all carriers corresponding to the to-be-scheduled terminal further comprise a carrier configured with an aperiodic CSI-RS, and for the carrier configured with an aperiodic CSI-RS, each state corresponding to values of bits in the aperiodic ZP CSI-RS indication field on each carrier indicates both a CSI process index and a ZP CSI-RS index.

9. The base station according to claim 8, wherein before the aperiodic CSI-RS is configured, the processor is configured to:
- configure, by a radio resource control (RRC), the CSI process index and the ZP CSI-RS index corresponding to each state; or
- predefine, in a system, the CSI process index and the ZP CSI-RS index corresponding to each state.

10. The base station according to claim 7, wherein the all carriers corresponding to the to-be-scheduled terminal further comprise a carrier configured with an aperiodic CSI-RS, and for the carrier configured with an aperiodic CSI-RS, each state corresponding to values of bits in the aperiodic ZP CSI-RS indication field on each carrier indicates a ZP CSI-RS index.

\* \* \* \* \*